United States Patent [19]
Kübler et al.

[11] Patent Number: 5,512,794
[45] Date of Patent: Apr. 30, 1996

[54] SHEAR ACCELEROMETER

[75] Inventors: John M. Kübler, E. Amherst; Michael D. Insalaco, Niagara Falls, both of N.Y.

[73] Assignee: Kistler Instrumente AG, Winterthur, Switzerland

[21] Appl. No.: 981,482

[22] Filed: Nov. 25, 1992

Related U.S. Application Data

[63] Continuation-in-part of Ser. No. 802,553, Dec. 5, 1991.

[51] Int. Cl.$^6$ .................................. H01L 41/08
[52] U.S. Cl. ............................ 310/329; 310/333
[58] Field of Search .................... 310/328, 329, 310/366, 344, 333; 73/517 R, 654, 35

[56] References Cited

U.S. PATENT DOCUMENTS

| | | | |
|---|---|---|---|
| 2,714,672 | 8/1955 | Wright et al. | 310/329 |
| 3,104,334 | 9/1963 | Bradley, Jr. et al. | 310/329 |
| 3,487,238 | 12/1969 | Angelton et al. | 310/329 |
| 3,545,283 | 7/1966 | McGunigle | 310/329 |
| 3,612,921 | 10/1971 | Springate | 310/329 |
| 3,614,488 | 10/1971 | Sonderegger et al. | 310/329 |
| 3,727,084 | 4/1973 | Epstein | 310/329 |
| 4,052,628 | 10/1977 | Hayer | 310/329 |
| 4,180,892 | 1/1980 | Jensen | 310/329 |
| 4,326,143 | 4/1982 | Guth et al. | 310/329 |
| 4,503,351 | 3/1985 | Sonderegger et al. | 310/329 |
| 4,586,377 | 5/1986 | Schmid | 310/329 X |
| 4,652,786 | 3/1987 | Mishiro | 310/329 |
| 4,667,127 | 5/1987 | Krempl et al. | 310/329 X |
| 4,959,993 | 10/1990 | Komurasaki | 310/329 X |
| 4,996,878 | 3/1991 | Kubler | 310/329 |

*Primary Examiner*—Mark O. Budd
*Attorney, Agent, or Firm*—Barnes & Thornburg

[57] ABSTRACT

An accelerometer having a pair of piezoplates and masses compressed to a center post by a bolt through bores in the center post, piezoplates and masses without mechanical or electrical contacting the piezoplates or the center post. A symmetrical arrangement includes opposed pairs of piezoplates separated by the center post or two pairs of piezoplates separated from each other by center post. Two bolts through orthogonal bores in a single center post or two perpendicular center post provide two and three axis of force sensing. Either linear or angular acceleration can be sensed. Two orthogonal mounting bores in the housing allows adjustment of the sensing axis.

26 Claims, 4 Drawing Sheets

SHEAR ACCELEROMETER

CROSS-REFERENCE RELATED APPLICATIONS

This application is a continuation-in-part of U.S. patent application Ser. No. 07/802,553 filed Dec. 5, 1991.

BACKGROUND AND SUMMARY OF THE INVENTION

The present invention relates generally to accelerometers employing piezoelectric materials and more specifically to shear piezoelectric sensors responsive to acceleration or vibration.

Accelerometers utilizing the shear principle have some special advantages compared to the standard compression type accelerometers as they are considerably less strain sensitive to mounting conditions.

A typical model of an accelerometer widely known on the market is described in Swiss Patent 547 489 and is shown in FIGS. 1 and 2 as prior art. Two shear type piezoplates 3 are screwed to a center post 2 with two masses 4 under the bolt heads.

Besides the requirement of insulation washers 10 and electrodes 9 to separate the signal from the structure, the state of the art systems have other disadvantages. The introduction of clearly defined shear forces to the faces of the piezoplates is not possible since the bolt can introduce forces to the bore of the piezoplates. In addition, the masses might absorb bending forces introduced by the bolts screwed into the center post. Thus the sensitivity of prior art accelerometer depends very much on the amount of the torque applied to the bolts as well as the assembly procedures.

According to the presented invention, all these uncertainties will be eliminated by providing novel means to exert only shear forces on the piezoplates in the main measurement direction z, independent of the torque of the pre-stress bolt, In addition no insulating washers and electrodes are required to obtain the measuring signal from the piezoplates.

The invention thus provides a new type of shear accelerometer of very simple design that can be produced to very accurate and repetitive specifications as no unwanted torque and force-moment effects can occur. Due to its design and production simplicity, the invention can be produced at a very competitive price level.

A further object of the invention is the symmetric distribution of clamping forces of the entire surfaces of the piezoplates and most important is the fact that the vectors (V) of clamping forces are perfectly perpendicular to the piezoplates and parallel to the axis of the through-bolt arrangement. These measures allow an absolute intimate contact of the shear transmitting faces with the result that an outstanding frequency response can be expected.

A further object of the invention is the possibility to include one more mass-screw arrangement to obtain a two or a three axis accelerometer all to the same design principle.

These and other objects are achieved by securing the piezoplates and the masses, each having a bore therein aligned with a bore of a center post of the body of a accelerometer, by a bolt extending through the bores to clamp the mass and piezoplates to the center post without contacting the center post. This provides mechanical and electrical isolation of the bolt from the center post. The bores are aided in their alignment by their common external dimensions on at least two sides and the bolt is aligned to the bores. The bolt may be mechanically and electrically isolated from the center post and the piezoplates by an annulus void or the annulus void may be filled with an electrically insulating and non-force transmitting sleeve.

In a symmetrical accelerometer arrangement, the pair of piezoplates are separated by the center post and the pair of masses are separated by the piezoplates, thus providing one axis sensing. In another embodiment, a first pair of piezoplates are separated from a second pair of piezoplates by the center post and a pair of masses are separated by the first and second pair of piezoplates, thus providing two axis sensing. A single bolt secures both pairs of piezoplates to the center post.

A combination of these two may be used for three axis of sensing wherein a pair of opposed piezoplates which are separated by the center post is secured by one bolt in a first bore and the two opposed pairs which are separated by the center post are secured by a second bolt in a second bore orthogonal to the first bore. Each piezoplate of the two pairs of piezoplates on the common bolt have a thickness, along the axis of the bore, half the thickness of the single pair of piezoplates along its bore. The single bolt pair of piezoelectric devices are shear type piezoplates and the two pairs along a single bolt include one pair of shear type piezoplates and a pair of compression type piezoplates or two pairs of shear type piezoplates. This accelerometer arrangement provides sensing forces along the x, y and z axis. By selecting the polarity of the piezoplates of a pair, linear or angular acceleration is sensed.

The orthogonal first and second bores may be in a single center post spaced vertically along the center post or may be in a pair of center post orthogonal to each other. The orthogonal center post would have generally an L or T shape.

To provide adjustment of the axis of sensitivity of the piezoelectric plates, the housing includes two orthogonal mounting bores in a plane perpendicular to the center post. One of the mounting bores is co-planar with the bore which receives the bolt mounting the pair of piezoelectric plates to the center post. The piezoelectric plates mounted to the center post in this embodiment may have parallel axis of sensitivity or orthogonal axis of sensitivity.

The external dimension on at least three sides of the center post, piezoplates and the mass are similar to aid alignment of the bores. An alignment tool having internal dimensions similar to the external dimensions aligns the bores during tightening of the bolts.

The objects and features of the invention will become apparent to those skilled in this art upon reference to the following specifications and drawings wherein embodiments of this invention are disclosed.

BEST MODE OF CARRYING OUT THE INVENTION

In order to simplify the description, it is assumed that the mounting base surface 8 of the accelerometers is perpendicular to the z axis.

It is further assumed to be well known that shear accelerometers utilize piezoelectric plates sensitive only to shear forces. The shear force vector of the piezoplates have to be aligned according to the sensitive axis as desired and as in the state of the art of the producers.

Piezoelectric crystal materials for such purposes are well known. The two groups: (a) industrial ceramics, or (b) natural crystals such as Quartz, Tourmaline can be used.

In industrial ceramics, a wide range of materials as barium titanate, lead metaniobate, lead zirconate and many other combinations can be used for the piezoplates.

Natural crystals produce a smaller amplitude electrical signal, however, they have far better temperature and age stability. Thus for precision applications, usually natural crystals are used, mainly quartz. The invention however is independent of the piezo material used.

Figure 1:
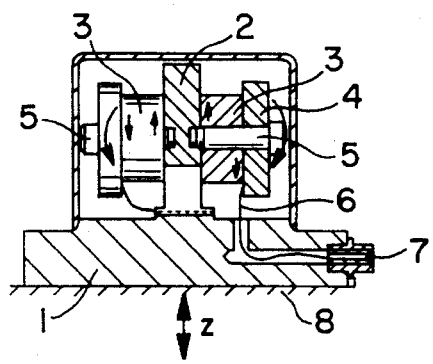
FIG. 1 is a cross-sectional view of an accelerometer of the prior art.

The prior art accelerometer of FIG. 1 is described in detail in Swiss Patent 547 489. It consists of the accelerometer body 1 having a center post 2 which is secured at a mounting base surface 8. Symmetrical arranged on both sides of the center post 2 are the piezoplates 3. They are prestressed via the masses 4 by individual bolts 5. The sensitive axis of the piezoplates 3 have to be accurately aligned in direction of the z axis. Then, the bolts 5 are finally torqued to the required amount to produce the required pre-stress. The use of two bolts does not assure that each piezoplate is under the same pre-stress.

Figure 2:
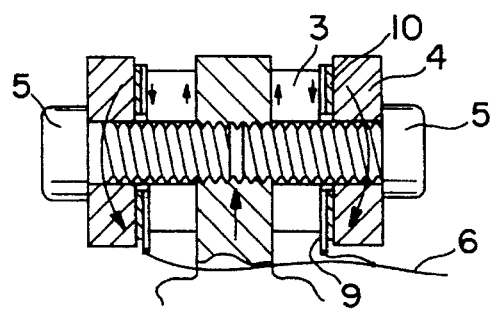
FIG. 2 is an exploded view of the accelerometer of FIG. 1 clearly showing electrodes and insulation discs.

In FIG. 2, the same prior art accelerometer is enlarged, showing the electrodes 9 in contact with the piezoplates and electrically insulated from masses 4 and bolts 5 by the insulation washers 10. The signal wire 6 connects the electrodes 9 to the connector in FIG. 1. Since the other side of the piezoplates are connected electrically to center post 2 as are the bolts 5, the bolts 5 must be electrically isolated from the electrodes 9. In this arrangement, the forces along the z axis applied and sensed by the piezoplates 3 include shear forces along the z axis and forces produced by the moment M illustrated in FIGS. 1 and 2. The moment M results from the cantilever arrangement of the bolts 5 about their securement to the center post 2.

An accelerometer according to the invention is shown in FIGS. 3–9. The innovative difference to the prior art of FIG. 1 is evident immediately. The arrangement of piezo-plates 3 symmetrical to the center post 2 is similar. The main difference however is one through-bolt 11 extends from one of the masses 4, passing through piezoplates 3 and center post 2 without touching them and is threadably received in the other mass 4. The annulus space 12 between bore and through-bolt 11 avoids mechanical and electrical contact between through-bolt 11 and piezoplates 3 and center post 2. This contact separation connects the two masses 4 into a solid unit exerting only shear forces onto the piezoplates 3. No possible bending moments M as in FIG. 1 and 2 will occur, since the through-bolt 11 has no securement to pivot about. Thus all forces parallel to the z axis remain parallel to the z axis and are not converted to moments by the through-bolts 11. All compressional forces introduced by the masses 4 and through-bolt 11 are only parallel to the axis of the through-bolt and the bores even in the presence of forces parallel to the z axis.

Since the through-bolt does not touch center post 2, it is electrically isolated from the center post 2 and therefore no insulation washer 5 is needed. Also separate electrodes 9 are not needed since the masses 4 can act as electrodes. Through-bolt 11 connects the two masses 4 thus conducting the measuring signal from both piezoplates 3 directly to signal wire 6. This reduces the series and contact resistances.

The accelerometer of the invention thus reacts exactly to input forces in z direction as no other forces or moments can have any influence. It is thus obvious that its accuracy is far superior to the state of the art designs.

The invention is not only mechanically perfect, it is also simpler to build as insulation washers 10 or electrodes 9 as shown on FIG. 2, are not necessary. The signal wire 6 can be welded directly on only one of the masses 4.

Figure 3:
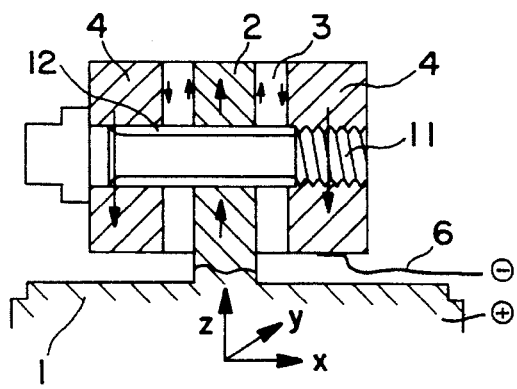
FIG. 3 is a cross-sectional view of an accelerometer incorporating the principles of the invention.
Figure 4:
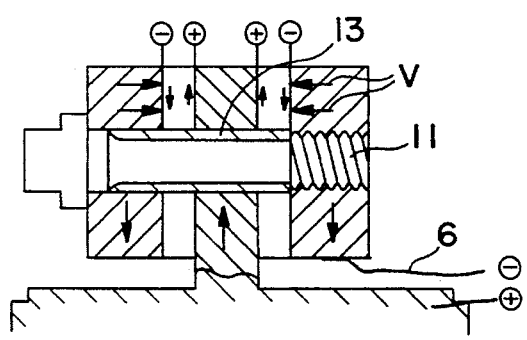
FIG. 4 is a cross-sectional view of another accelerometer incorporating the principles of the invention.

FIG. 4 shows a variant of the embodiment of FIG. 3 wherein the no contact annulus 12 is filled with a radially elastic, electrically insulation sleeve 13. This could be a soft slotted teflon pipe or a cast on silicon rubber sleeve or a similar device transmitting no radial force from through-bolt 11 to parts of the bore and electrically insulating the through-bolt 11 from the center post 2 and piezoplates 3.

Figure 5:
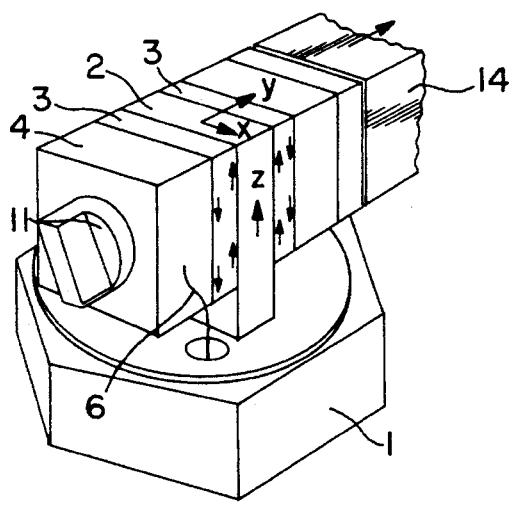
FIG. 5 is a perspective view of an alignment tool incorporating the principles of the invention.

To align the through-bolt 11 in the bore of center post 2 and maintain the non contact annulus 12 during assembly of the device, a simple alignment tool 14 is used as illustrated in FIGS. 5. Piezoplates 3, masses 4 and the center post 2 have the very same geometric dimensions on at least two sides and the tool 14 is placed over the assembly group during the tightening of the through-bolt 11. While the geometric dimensions aid the alignment of the bores, the contact between the through-bolt 11 and the bore of the mass aligns the through-bolt to the aligned bores. This simple means allow perfect centering of the different parts and maintaining the non contact annulus 12. Other devices or visual alignment can be achieved using the similar external dimensions.

With the insulation sleeve 13 inside as in FIG. 4, no alignment tool is required. However, the accelerometer contains one more part. Although not required in the assembly of FIG. 4, the alignment tool 14 would remove any misalignment of the masses 4 and piezoplates 3 in the z axis.

Figure 6:
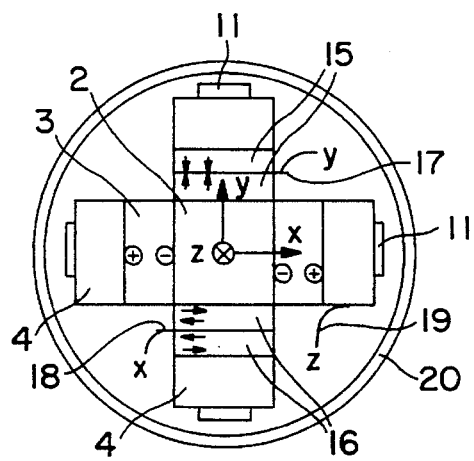
FIG. 6 is a top view of a multi axis accelerometer incorporating the principles of the invention.

In FIG. 6 a top view of a 3-axis accelerometer according to the invention shows other outstanding features of the invention. With one or with two through-bolt 11 arrangements, it is possible to obtain a two axis z-x or a three axis z-y-x accelerometer. FIG. 6 shows the variant of a three axis design with the two through-bolt arrangements assembled in two orthogonal bores, one above the other in the same center post 2.

The invention in FIG. 6 allows a standard signal on all three electrodes 17, 18 and 19. An electrode 17 for the y signal is arranged between two compression type piezoplates 15 and an electrode 18 between two shear type piezoplates 16. Electrode 19 for the Z signal is connected to one of the masses 4. The piezoplates 15 and 16 are half the thickness of the normal shear type piezoplates 3 of the main z axis. Since the masses 4 for piezoplates 15 and 16 are not electrically connected to the center post 2 by through-bolt 11, they are connected to the center post 11 externally by electrodes not shown. Thus the center post forms a common electrode for all three pairs of piezoplates.

Even this complex arrangement requires no insulation washers as shown in FIG. 2 even though separate electrodes are required for the y and x signal.

As illustrated in FIGS. 3–6, the polarities of the piezoplates are connected in a aiding or additive arrangement. In FIGS. 3–4, the piezoplates 3 connected to center post 2 are positive, and in FIG. 6, the negative faces are connected to center post 2. The arrows also indicate not only the polarity but also the type and axis of the piezoplates. In FIG. 6, the piezoplates 3 and 16 are shear type and piezoplates 15 are compression type. The connection and polarity illustrated in FIGS. 3–6 for the shear type piezoplates 3 provides measurement of linear acceleration along the z axis and cancellation of angular acceleration about the y-axis as described in U.S. Pat. No. 4,996,878. By reversing the polarity of one of the piezoplates 3, the piezoplates 3 will sense angular acceleration about the y-axis and cancel linear acceleration along the z axis. This selection is possible without the use of separate electrodes 9 and insulation washers 10.

Figure 7:
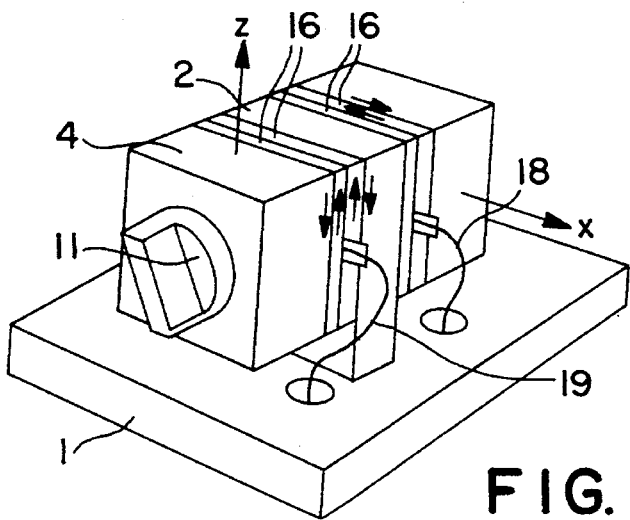
FIG. 7 is a perspective view of the two axis accelerometer using shear-type piezoelectric plates incorporating the principles of the present invention.

An accelerometer which measures acceleration along the z and x axis using only shear type piezoelectric plates is illustrated in FIG. 7. As in FIG. 6, a pair of double piezoelectric plates 16 with an intermediate signal electrode is provided for the z axis and the x axis on respective side of the center post 2. Electrode 18 for the x signal and electrode 19 for the z signal are connected to amplifiers or other indicating or signal processing devices. The through-bolt 11 mounts the two masses 4 and the two pairs of piezoelectric plates 16 to center post 2 without contacting the center post 2.

Figure 8:
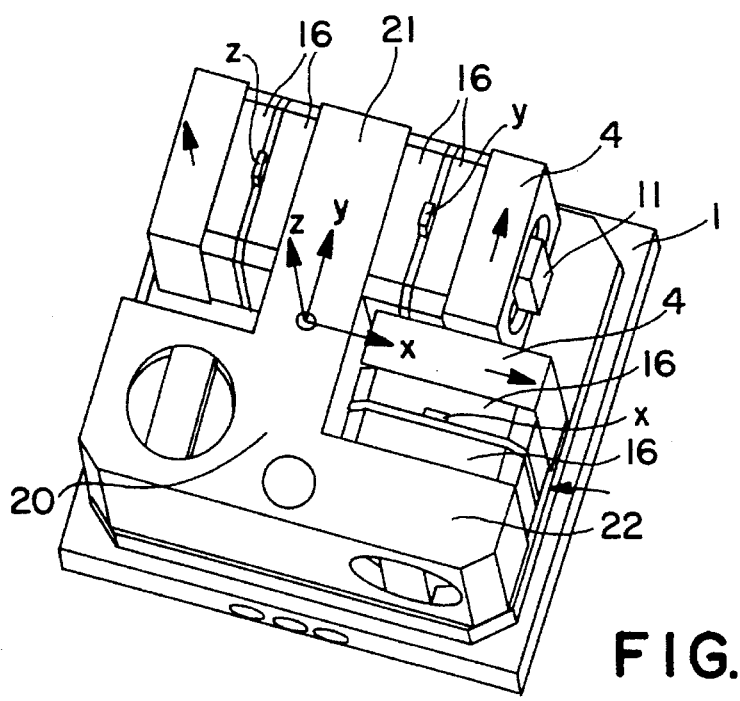
FIG. 8 is a perspective view of a three axis accelerometer incorporating the principles of the present invention.

A further variation of FIG. 6 to sense acceleration in all three axis (namely x, y and z) is illustrated in FIG. 8. The center post 20 is shown as generally T shaped including a center bar 21 and a cross-bar 22. On both sides of the center bar 21 are pairs of piezoelectric plates 16 with an intermediate signal electrode and a seismic mass 14. One of the shear-type piezoelectric plates senses acceleration in the z axis and the other pair of shear-type piezoelectric plates 16 senses acceleration in the y axis. The two masses 4 and the two pairs of piezoelectric plates 16 are clamped together by a through-bolt 11 which does not contact the center bar 21, nor either of the pairs of piezoelectric plates 16.

A third pair of piezoelectric plates 16 with an intermediate signal electrode is mounted to the cross-bar 22 by a through-bolt 11. The through-bolt 11 does not contact the cross-bar 22 nor either of the piezoelectric plates 16. The pair of piezoelectric plates are also shear-type.

In contrast to the accelerometer of FIG. 6, wherein the compression mode piezoelectric crystals are used to sense acceleration in the y axis, FIG. 8 uses shear-type piezoelectric crystals for all three axis of acceleration. Thus, the influence of temperature are the same for all measuring elements. Also, shear-type piezoelectric measuring elements are less temperature sensitive than compression type measuring elements. The manufacturing of shear-type only measuring elements, for example quartz-elements, is much simpler than manufacturing of the combined shear type and compression type measuring elements.

Although the center post 20 is shown as generally T-shaped, it may also be L-shaped. The importance is that the center post 20 provides two bars perpendicular to each other and extending parallel to an axis, here the z axis. Thus the two bores for the through-bolts 11 are perpendicular.

Figure 9:
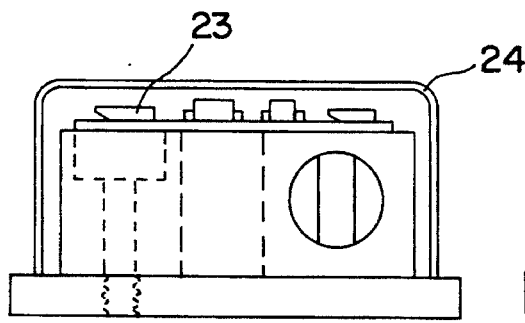
FIG. 9 is a side view of the accelerometer of FIG. 8 with a cover.
Figure 10:
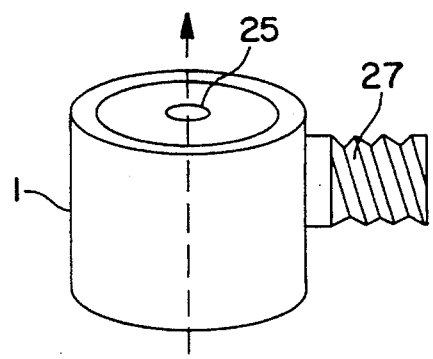
FIG. 10 is a prospective view of an accelerometer housing of the prior art.

FIG. 9 shows a housing cover 24 for the accelerometer of FIG. 8. The flat upper surface of the T-shaped center post 20 provides an appropriate place for electronic elements including illustrated semiconductor amplifier 23.

A standard accelerometer housing one of the prior art includes a plug 27 for the electro-signal cables. A bore 25 is provided to receive a screw or other fastener to secure the housing to a mounting surface.

A shear-type piezoelectric plates have a single direction of maximum sensitivity. To accurately align the direction of sensitivity and to provide the ability to use a single piezoelectric plate to sense in either one of two axis or directions, the housing 1 is provided with a pair of orthogonal bores 25 A and 25 B, as illustrated in FIGS. 11–14. The accelerator body 1 supports the center post 2 and, piezoelectric plates 3 and seismic masses 4 are arranged in an axis perpendicular to the center post. The housing 24 is also illustrated. The axis sensitivity of the shear piezoelectric crystals 3 are illustrated in the FIGS. 12–14 as being parallel to the axis of bore 25 A and perpendicular to the axis of bore 25 B. Thus, a fastener 26 within bore 25 A mounts the piezoelectric plates 3 to a mounting surface so as to be responsive to accelerations perpendicular to the mounting surface. This would be the z axis with respect to the other drawings.

Figure 11:
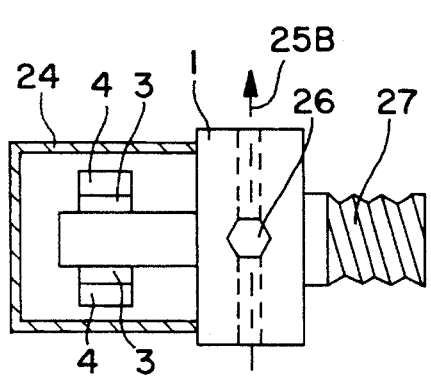
FIG. 11 is a partial cut-away plan view of an adjustable axis accelerometer incorporating the principles of the present invention.
Figure 12:
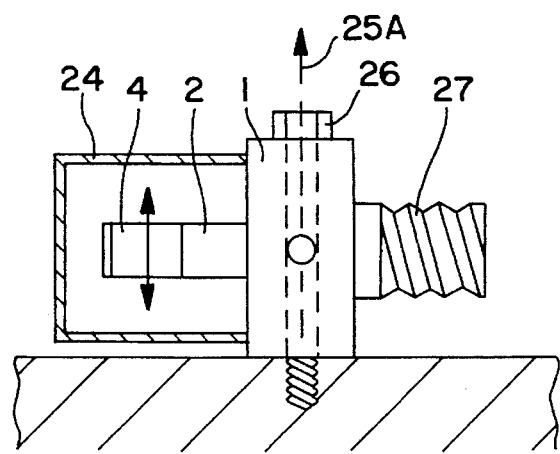
FIG. 12 is a partial cut-away side view of the accelerometer of FIG. 11.
Figure 13:
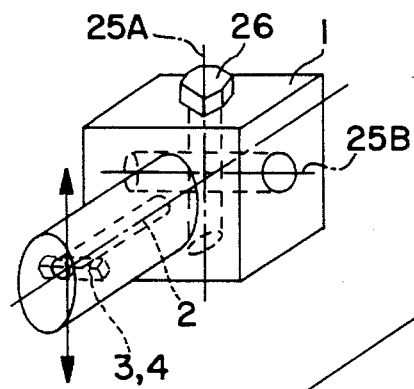
FIGS. 13 and 14 are perspective views of the accelerometer of FIGS. 11 and 12 at two different orientations.
Figure 14:
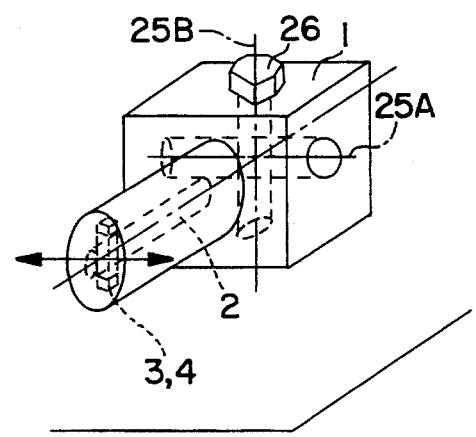

The angular position of the center post 2 may be any of the 360° about the axis 25 A, but the axis of sensitivity will always be perpendicular to the mounting surface to sense the acceleration along the z axis as illustrated in FIGS. 11–13. By rotating the accelerometer body 1 by 90° the sensing axis of the piezoelectric plates becomes parallel to the mounting surface. A screw 26 going through bore 25 B thereby mounts the piezoelectric crystals to the mounting surface with its sensitive axis parallel to the mounting surface. By rotating the piezoelectric crystals 3 about the axis 25 B, it can sense acceleration within a plane parallel to the mounting surface. Using the coordinate system in the previous figures, the piezoelectric plates 3 may sense acceleration in the x or y merely by appropriately positioning it about the axis 25 B. Assuming the piezoelectric plates as illustrated in FIG. 14 sense acceleration in the x axis, rotating 90° with respect to the axis of 25 B, it will then sense acceleration in the y axis. Thus, as illustrated in FIGS. 11–14, by providing two perpendicular bores orthogonal to the center post, a single shear-type piezoelectric plate may sense acceleration in any of the three axis depending upon the appropriate mounting.

In the embodiments of the invention previously described, a pair of piezoelectric plates for a given axis of measurement or sensitivity have always been in the same axis and direction.

While the shear-type devices wherein the pair measure acceleration along a common axis, there are times when measurements along portions of a given plane is important.

Figure 15:
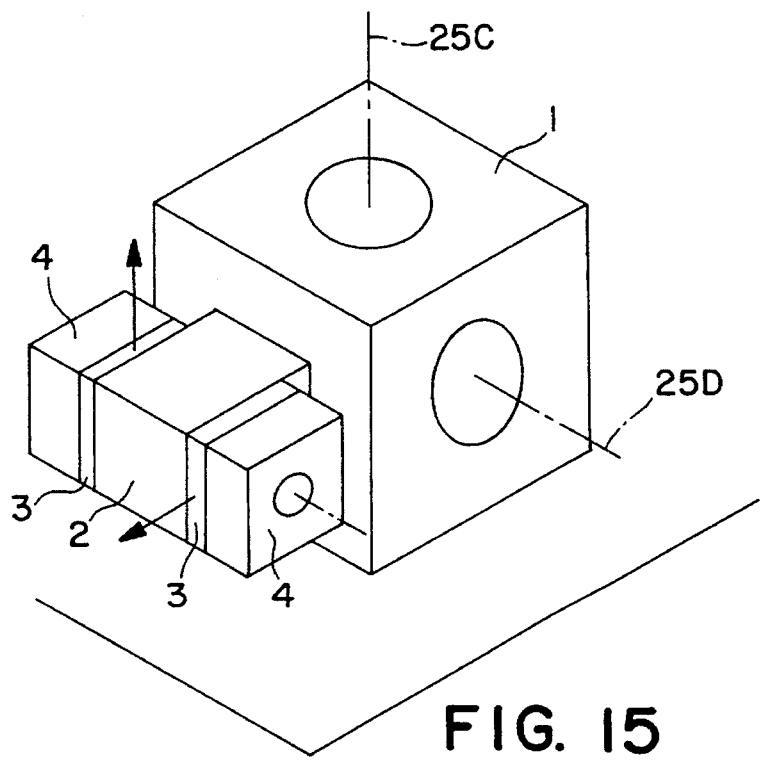
FIGS. 15 and 16 are perspective views of another embodiment of an accelerometer of the present invention at two different orientations.
Figure 16:
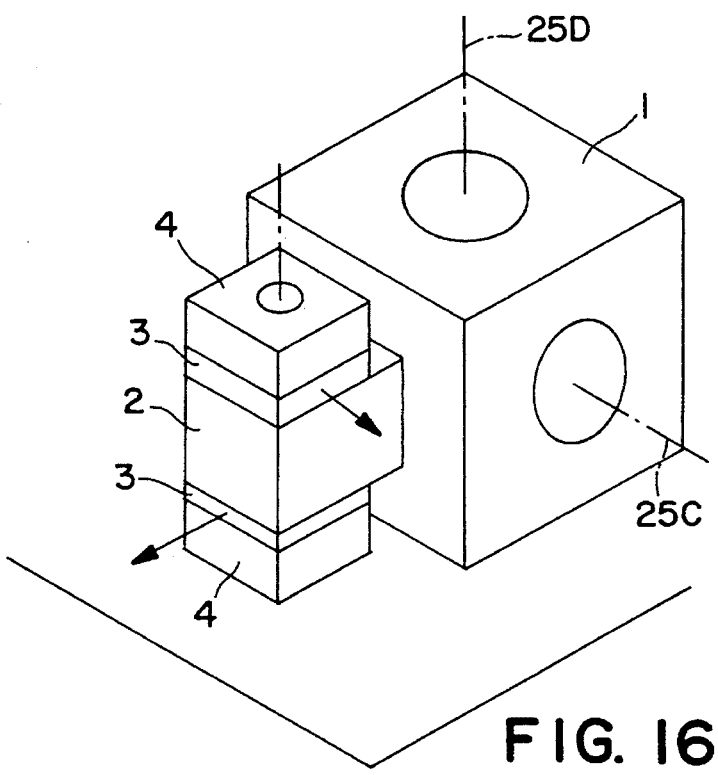

The embodiments of FIGS. 15 and 16 show a pair of shear-type piezoplates 3 having their main axis of sensitivity perpendicular to each other. As illustrated, they define a plane perpendicular to the axis of the bore 25 D of the accelerometer body 1. By securing the accelerometer body 1 with the fastener through bore 25 C, the piezoelectric plates 3 will measure forces in an infinite number of planes perpendicular to the mounting surface. As previously described, the housing 1 can be rotated about the axis 25 C to define the specific plane, all of which are perpendicular to the mounting surface.

By rotating accelerometer body 1 by 90° and securing the accelerometer body to the mounting surface using bore 25 D, the plane defined by the axis of sensitivity of the piezoelectric plates 3 is parallel to the mounting surface. Again as in the previous embodiments, this plane can be rotated about the axis 25 D to any of the 360° rotation. Although a single piezoelectric plates 3 has been discussed with respect to FIGS. 15 and 16, each may be represented by a pair of piezoelectric plates with enter disposed electrodes as described previously as piezoelectric pair 16.

The mounting bores 25 in each housing of FIGS. 11–16 are perpendicular to each other in a plane perpendicular to the center post 2. One of the mounting bores 25 is co-planar with the bore of the through-bolt which mounts the piezoplates 3 to the center post. In FIGS. 11 and 14 and FIGS. 15 and 16 this is axis 25 B and 25 D, respectively.

Although the present invention has been shown as a symmetrical device, it can also be used in non-symmetrical arrangement and still incorporate the principles of the present invention. For example, one of the piezoplates 3 may be replaced by insulative washer to obtain the electrical isolation between the masses 4 and the through-bolt 11 from the center post 2. To maintain mechanical symmetry of the system if desired, the mass 4 may be increased to compensate for any difference loss between the piezoplate 3 and the insulated washer.

The invention thus provides high precision and simple designed accelerometers for multi axis application with same standard signal amplitude in all axis.

The invention thus elevates the performance of shear accelerometers to considerably higher precision, to higher repeatability of results due to absence of unwanted parameters affecting results and at the same time allows higher performance at lower costs. The concept can be utilized in a modal approach allowing the efficient assembly of one- and multi axis accelerometers.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An accelerometer comprising:

a body including a center post having a first bore therein;

at least one first piezoplate and at least one first mass each having a first bore;

a first bolt in said first bores, clamping said mass and said piezoplate to said center post without contacting said center post;

means for aiding alignment of said first bores; and means for aligning said first bolt in said first bores to maintain non contact between said first bolt and said center post.

2. An accelerometer according to claim 1, wherein said bolt does not contact said piezoplate.

3. An accelerometer according to claim 1, wherein said piezoplate is a shear type piezoplate for sensing forces transverse to said bore.

4. An accelerometer according to claim 1, wherein said bolt has a smaller diameter than the diameter of the bore of said center post so as to create a non-contact annulus therebetween.

5. An accelerometer according to claim 1, including an electrical insulating and non-force transmitting sleeve separating said bolt from said bore of said center plate.

6. An accelerometer according to claim 5, wherein said sleeve is one of a slotted teflon sleeve or a silicon rubber sleeve.

7. An accelerometer according to claim 1, wherein said aiding means includes said center post, said piezoplate and said mass having similar external dimensions on at least two sides to aid alignment of said first bores.

8. An accelerometer according to claim 7, including an alignment tool having an internal dimension similar to said similar external dimensions for aligning said first bores during tightening of said bolt.

9. An accelerometer according to claim 1, wherein said center post having a second bore orthogonal to said first bore; and including at least one second piezoplate and at least one second mass each having a second bore and a second bolt in said second bores and clamping said second mass and piezoplate to said center post without contacting said center post.

10. An accelerometer according to claim 9, wherein:

said center post extends parallel to a Z axis of said body, said first bore is parallel to an X axis of said body and said second bore is parallel to a Y axis of said body;

said first and second piezoplates are shear type piezoplates; and said first piezoplate senses forces along said Z axis of said body and said second piezoplate sensing forces along said X axis of said body.

11. An accelerometer according to claim 9, wherein:

said center post extends parallel to a Z axis of said body, said first bore is parallel to an X axis of said body and said second bore is parallel to a Y axis of said body;

said first piezoplate is a shear type piezoplate;

said second piezoplate is a compression type piezoplate; and said first piezoplate senses forces along said Z axis of said body and said second piezoplate senses forces along said Y axis of said body.

12. An accelerometer according to claim 9, wherein said center post extends parallel to a Z axis of said body, said first bore is parallel to an X axis of said body and said second bore is parallel to a Y axis of said body;

including at least one third piezoplate having a third bore and being clamped to said center post by one of said first or second bolts in said third bore; and wherein said first piezoplate senses forces along said Z axis of said body, said second piezoplate senses forces along said X axis of said body and said third piezoplate senses forces along said Y axis of said body.

13. An accelerometer according to claim 12, wherein said first, second and third piezoplates are shear type piezoplates.

14. An accelerometer according to claim 12, wherein said center post includes two bars perpendicular to each other and parallel to said Z axis, and each bar including one of said first and second bores.

15. An accelerometer according to claim 9, wherein a pair of first piezoplates are separated by said center post, and a pair of first masses are separated by said first pair of piezoplates;

including a pair of third piezoplates each having a third bore and being clamped to said center post by said second bolt in said third bore; and wherein said center post separates a pair of second piezoplates from said third pair of piezoplates and a pair of second masses are separated by said second and third pairs of piezoplates.

16. An accelerometer according to claim 15, wherein said second and third pairs of piezoplates each have a thickness along their respective bores half the thickness of said first pair of piezoplates along said first bore.

17. An accelerometer according to claim 1, wherein said center post is one contact for a pair of first piezoplates and one of a pair of first masses is the other contact for said first pair of piezoplates.

18. An accelerometer according to claim 17, wherein said first piezoplates have a common polarity contacting said center post for sensing linear acceleration.

19. An accelerometer according to claim 17, wherein said first piezoplates have a opposite polarities contacting said center post for sensing angular acceleration.

20. An accelerometer according to claim 1, wherein a pair of first piezoplates separates said first mass from said center post;

including a pair of second piezoplates separating a second mass from said center post and each having a second bore; and wherein said first bolt in said second bores clamps said second mass and piezoplates to said center post.

21. A symmetrical accelerometer comprising:

a body including a center post having a first bore therein;

a pair of piezoplates and a pair of masses each having a bore; and a bolt means, in said bores and sufficiently spaced from said first bore, for compressing said masses and said piezoplates to said center post only with evenly distributed clamping force parallel to the axis of said first bore even in the presence of forces transverse to said axis of said first bore.

22. An accelerometer according to claim 21, wherein said piezoplates are shear type piezoplates having an axis of sensitivity transverse to the axis of said bore and perpendicular to each other.

23. An accelerometer according to claim 21, wherein said body includes a pair of mounting bores perpendicular to each other in a plane perpendicular to said center post and one of said mounting bores is co-planar with said first bore.

24. A shear type accelerometer for sensing force in an X, Y and Z axis comprising:

a housing having a center post including a first and second bar perpendicular to each other and extending parallel to said Z axis;

a first bore in said first bar extending parallel to said Y axis and a second bore in said second bar extending parallel to said X axis;

first, second and third pairs of shear type piezoplates for sensing forces in said X, Y and Z axis respectively;

first, second and third masses;

a first bolt in said first bore for mounting said first and third pairs of piezoplates and a respective mass to opposite sides of said first bar; and a second bolt in said second bore for mounting said second pair of piezoplates and said second mass to said second bar.

25. An accelerometer according to claim 24, including an electrode between the piezoplates of each pair.

26. An accelerometer according to claim 1 wherein said aligning means includes contact between said first bolt and said first bore of said first mass.

* * * * *